May 9, 1961  S. SMITH ET AL  2,982,998
METHOD OF PRODUCING MOLDS
Filed May 20, 1957
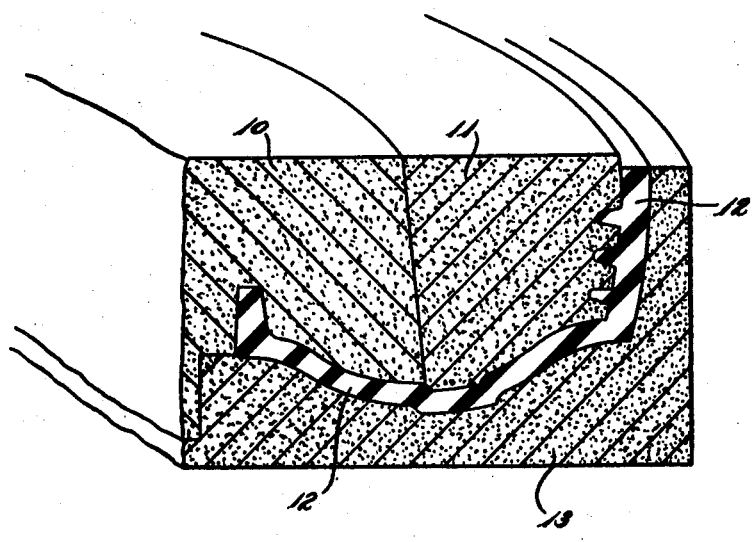
INVENTORS
SYDNEY SMITH
FREDERICK W. STAVELY
BY
W. A. Fraser
ATTY.

United States Patent Office 2,982,998
Patented May 9, 1961

2,982,998

METHOD OF PRODUCING MOLDS

Sydney Smith and Frederick W. Stavely, Akron, Ohio, assignors to The Firestone Tire & Rubber Company, Akron, Ohio, a corporation of Ohio Filed May 20, 1957, Ser. No. 660,332

3 Claims. (Cl. 18—53)

This invention relates to the production of molds and, more particularly, to a method of producing molds for curing rubber articles.

In the manufacture of metal molds for use in the production of rubber articles carrying relief pattern, and particularly in the manufacture of metal molds for the production of pneumatic rubber tires, a process of precision molding is commonly employed. This process consists of (a) making a positive model, usually of plaster, of a segment of the tire tread desired, (b) making a flexible negative mat of the positive model, (c) adhering a rigid backing structure to the back surface of the mat, (d) stripping the flexible negative mat from the positive model of step (a), (e) employing the flexible mat in making a hard, ceramic-like positive mold core, and (f) employing the required number of positive core segments to cast a full circle metal mold half for the tire. Any number of the desired rubber tires may be produced by repeatedly vulcanizing green tires within the complete mold.

The positive plaster model of step (a) is prepared in a manner well known in the plaster art; it is to be understood that the model can also be made of wood, metal, cured epoxy or phenolic resins or any other material which will not deform when subjected to the curing temperature of the flexible mat material. The flexible negative mat of step (b) is made by casting about the positive pattern or model of step (a), a material which hardens sufficiently to retain the tire tread details and yet remains flexible and strong enough to permit it to be stripped from the model and later to be repeatedly stripped from the positive ceramic mold core of step (e) and reused in producing additional mold cores. The so-called Shaw process relates to the production of the hard mold core from a slurry of ethyl silicate, methyl or ethyl alcohol, and a fine refractory sand along with a small quantity of water, hydrochloric acid and piperidine. The quantities of materials used, and the method of mixing and molding are well known to those skilled in the art. Likewise, the method of casting the metal negative mold of step (f) is well known in the mold manufacturing art.

A variety of materials have been employed in producing the intermediate flexible mat. To date the most commonly employed and most successful materials have been the polyvinyl chloride plastisols and "Thiokol" liquid polymers.[1] However, all of the previously used materials have been characterized by several serious limitations. Many of the otherwise satisfactory materials, including the vinyls and the Thiokol polymers, lack dimensional stability after only limited use in the Shaw molding operation. Moreover, the alcohol in the ethyl silicate slurry and that produced in situ by hydrolysis of the silicate adversely affects most flexible mold materials presently used. Specifically, when exposed to methyl or ethyl alcohol molds formed from plastisols (plasticized polyvinyl chlorides) become hard and stiff and are easily torn or cracked. On the other hand, molds formed from the cured Thiokol polymers shrink when contacted with methanol and ethanol to the point where desired irregularities of the mold, such as serrated ribs and the like, become straight. Flexible molds which become torn or which are dimensionally unstable produce improperly formed cores which result in defective negative metal molds and ultimately in imperfectly formed rubber articles. This is particularly serious where the ultimate rubber commodity is a precision article such as an automobile tire.

In view of these and other difficulties attending the production and use of flexible molds in the Shaw process, it has been possible to use such prior art mats only a few times before deterioration causes them to produce an inferior product. Production costs thus have been undesirably high.

In view of the foregoing and other difficulties, an object of the present invention is to provide a composition which is moldable and rapidly curable to form a flexible and durable pattern structure characterized by greatly enhanced durability, dimensional stability, and resistance to attack by alcohols.

Another object of the invention is to provide a flexible, dimensionally stable, tear resistant mat structure operable accurately to reproduce form and dimensions through a large number of casting operations.

A further object of the present invention is to provide a method of making a flexible mat structure operable to reproduce form and dimensions accurately in a large number of casting operations, without cracking, tearing or loss in dimensional stability.

A further object of this invention is to provide a method of producing a metal tire mold, wherein the intermediate mat is composed of a material which is flexible, resilient, tear resistant, and dimensionally stable.

The above and additional objects are attained by the present invention. In accordance with the invention it has been determined that durable, flexible mats of greatly enhanced structural stability are formed by curing a composition comprising dead milled rubber, a vulcanizing agent and a vulcanization accelerator against a model of the desired configuration.

The invention includes a method of making a flexible, resilient, dimensionally stable negative mat structure suitable for repeated use in the production of mold cores and also of plaster or plastic models, which comprises forming a positive model of the desired flexible negative pattern, casting about said model a composition comprising dead milled rubber and a vulcanizing agent, and curing said composition to form a vulcanizate. The mat structure of the invention and its formation are illustrated in the single figure of the accompanying drawing, in which a two-part model 10, 11 and a shell structure 13 provide a mold cavity which is filled by the dead milled rubber composition of the invention to provide upon vulcanization thereof a mat 12 carrying on its inner surface a negative design of the exterior surface of model 10, 11.

Also embraced by the present invention is a method of making a metallic mold for use in the production of rubber articles with a relief design thereon which comprises forming a positive model of the desired rubber article, casting about said model a composition comprising dead milled rubber and a vulcanizing agent, curing said composition to form a flexible vulcanizate mat carrying a negative pattern of the relief design, stripping the vulcanized mat from the model, forming a hard ceramic core against the pliable, resilient mat, stripping the pliable, resilient mat from the core, and casting a metal about the core.

The present invention also includes a method of making a rubber article carrying a relief design, which comprises forming a model of the desired rubber article, casting about the model a composition comprising dead milled

[1] Produced by Thiokol Chemical Corp.

rubber and a vulcanizing agent, curing said composition to form a vulcanized mat carrying a negative pattern of the relief design, stripping said vulcanized mat from the model, forming a hard ceramic core against the mat, stripping the vulcanized mat from the core, casting a metal about the core to form a metal mold having the desired pattern in reverse thereon, and finally pressing and curing the rubber article against the metal mold.

It has been discovered that a special, fast curing dead milled rubber composition possesses characteristics making it particularly suitable for producing an intermediate flexible mat useful in the Shaw process for the production of the metal molds for the manufacture of molded rubber articles with relief patterns thereon, such as rubber tires.

It further has been discovered that a pattern comprising a vulcanized dead milled rubber may be repeatedly reused in the production of molds without any of the difficulties attending use of the prior art mats formed from vinyl compositions and Thiokol polymers. The vulcanized mats according to the invention are pliable, resilient and dimensionally stable and may be repeatedly used without losing size or shape or without distortion of the design. These mats are resistant to alcohol used in the production of ethyl silicate-sand cores by the Shaw process. After repeated contact with the core composition and alcohol contained therein, a vulcanized dead milled rubber mat remains soft and pliable and retains its original dimensions. The mats of the invention exhibit greatly improved resistance to tearing, cracking or checking when subjected to the abuse inherent in repeated stripping operations, even when undercut designs are employed.

Dead milled rubber is a natural or "synthetic natural" rubber or rubber composition which has been subjected to milling or plasticating operations for a period of time sufficient to render it non-elastic and of a sufficiently low viscosity to permit flow at room temperature under low pressures. Having lost its resiliency and ability to hold a definite shape it is said to be "dead." The dead milled rubber most suitable for use in practicing the present invention has a viscosity sufficiently low to permit flow at room temperature under a pressure of no more than about 10 pounds per square inch. Natural rubber which may be conveniently milled to produce the desired dead milled rubber useful in the practice of the present invention is generally available commercially. A common and convenient form of natural rubber is smoked sheets. Smoked Hevea sheet stock of medium weight can be satisfactorily processed for use in the present invention by milling at a temperature of about 100° F. for approximately 90 minutes with a medium rolling bank and without cutting. Dead milled rubber can also be produced by treating natural rubber with a peptizing agent with or without additional milling or other mechanical working, as is known in the art.

The so-called "synthetic natural rubbers" which are operable in the present invention are high cis-1,4-polyisoprenes which can be produced by polymerization of isoprene in the presence of a lithium containing catalyst or a Ziegler type catalyst such as a complex of titanium tetrachloride and an alkyl aluminum. The resulting polymers can be dead milled or peptized in the same manner as natural rubber and employed in preparation of the flexible molds of the invention. A more complete description of these polyisoprenes can be found in articles by F. W. Stavely et al., Industrial and Engineering Chemistry, vol. 48, pp. 778–783 (April 1956) and by S. E. Horne, Jr., et al., Ibid., vol. 48, pp. 784–791.

Molding compositions according to the invention preferably comprise dead milled rubber, a metallic oxide, a curing agent and an accelerator.

The preferred curing or vulcanizing agent is elemental sulfur, and it is preferably incorporated in quantities ranging between about 0.3 and about 10 parts by weight per 100 parts of dead milled rubber. Use of less than 0.3 part sulfur generally produces a vulcanizate of insufficient tensile strength, whereas the use of greater than about 10 parts sulfur results in a semi-hard material of inadequate flexibility. Especially preferred as the vulcanizing agent of the invention is elemental sulfur in an amount between about 0.5 and about 2.0 parts by weight per 100 parts dead milled rubber. Other vulcanizing agents which can be successfully employed in practicing the invention are sulfur donors, comprising the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Vulcanizing agents other than free sulfur are employed in an amount sufficient to produce a cure equivalent to that produced by incorporation in the mix of from about 0.3 to about 10 parts of elemental sulfur.

Various finely divided metallic oxides can be added prior to vulcanizing dead milled rubber to assist in curing the rubber. Operable metallic oxides include, without limitation, zinc oxide, calcium oxide, magnesium oxide, iron oxide and lead oxide. The metal oxides are also of assistance as reinforcing agents or fillers and serve as pigments where a light-colored vulcanizate is desired. The metallic oxides are preferably employed in a quantity ranging between about 1 and about 20 parts by weight per 100 parts of dead milled rubber. Incorporation of from about 2 to about 15 parts of zinc oxide is especially preferred. Conventional fillers and reinforcing agents known to the rubber compounding art can be employed in the compositions of the invention. These include, without limitation, the above listed metal oxides, silicon dioxide, including the hydrated variety; slate flour, litharge, whiting, and carbon blacks, including those made by the channel process as well as the various furnace blacks. Care should be exercised to use only small proportions of reinforcing carbon blacks because of their tendency to stiffen the dead milled rubber composition to the extent that it may not readily flow during the molding process. Soft "semi-reinforcing" carbon black and silicon dioxide are preferred reinforcing agents. Of the available silicon dioxides, that sold under the trademark "HiSil"[2] has been found suitable. Mixtures of the oxides and blacks can be employed. In general, the amount of reinforcing agent employed will be varied depending on the known ability of the agent to stiffen unvulcanized rubber compounds and its effect on the tensile strength of such compositions.

Among the conventional accelerators which can be employed to cure the compositions of the invention are mercaptobenzothiazole and its derivatives; tetramethyl thiuram disulfide and other known thiuram sulfide accelerators; the salts of dithiocarbamic acid such as zinc dimethyl dithiocarbamate, zinc diethyl dithiocarbamate, zinc dibutyl dithiocarbamate, zinc-N-pentamethylene dithiocarbamate, 2,4-dinitro-phenyl dimethyl dithiocarbamate piperidinium pentamethylene dithiocarbamate and selenium diethyl dithiocarbamate. While operable, these conventional accelerators alone are characterized by a slowness of action which may be undesirable in some commercial operations.

It has been discovered, however, that superior results are obtained, both in terms of end product and speed of cure, when an activated dithiocarbamate is employed as an accelerator. Dithiocarbamates, such as those listed above and mixtures thereof, are suitably activated, for example, by reaction with or admixture with a free aliphatic or cycloaliphatic amine such as diethylamine, cyclohexylethyl amine, tetraethylene pentamine, the

---

[2] A hydrated silicon dioxide sold by the Columbia Southern Chemical Company, a Division of the Pittsburgh Plate Glass Company.

mono-, di-, or tri-ethanolamines and the like. These amines can be further activated and also stabilized by reaction with carbon disulfide. A preferred activated dithiocarbamate accelerator is sold by R. T. Vanderbilt Company under the trade name Butyl Eight.

Very effective accelerators are also obtained by admixing the activated dithiocarbamates with xanthates such as zinc methyl xanthate, zinc ethyl xanthate, zinc butyl xanthate and zinc propyl xanthate; or with the zinc salts of the various dithiocarbamic acids such as zinc dimethyl dithiocarbamate, zinc diethyl dithiocarbamate, zinc dibutyl dithiocarbamate, and the like. Used alone, these additives are not sufficiently fast in their action but react synergistically with the activated dithiocarbamates to effect rapid cures.

The accelerator is employed in a quantity ranging from about 1 to about 8 parts by weight per 100 parts of dead milled rubber. Between about 2 and about 5 parts of accelerator is preferred.

Between about 0.5 and about 5.0 parts, and preferably between 0.5 and 2.5 parts of any suitable rubber antioxidant is desirably incorporated in the dead milled rubber composition. Antioxidants which can be employed include, without limitation, 2,2'-methylene bis-6-t-butyl-4-methylphenol, phenyl betanaphthylamine, phenyl alphanaphthylamine, aldol alphanaphthylamine, diphenylamine-acetone reaction products; or the various known condensation products of acetone and para-substituted anilines, e.g., 2,2,4-trimethyl-6-dodecyl-1,2-dihydroquinoline and 2,2,4-trimethyl-6-ethoxy-1,2-dihydroquinoline.

Having generally described the invention, the following examples are presented for purposes of illustrating the various embodiments thereof. Unless otherwise indicated, all parts are parts by weight based on 100 parts of dead milled rubber.

Example 1

Six hundred grams of medium weight smoked Hevea sheet was milled without cutting at a temperature of about 100° F. for a period of 90 minutes on a mill having rollers 10 inches in diameter and 20 inches between the mill guides. The milled product was plastic in nature and displayed practically no ability to regain its shape after being deformed.

Example 2

Employing the product of Example 1, a compounded stock suitable for vulcanization was produced using as a recipe:

| | Parts |
|---|---|
| Natural rubber-dead milled as in Example 1 | 100 |
| Zinc oxide | 5 |
| Antioxidant (2,2'-methylene bis-6-t-butyl-4-methyl phenol) | 1 |
| Sulfur | 1 |
| Accelerator (Butyl Eight) | 4 |

The following mixing procedure was employed. The dead milled natural rubber was cooled at room temperature for one hour after the milling described in Example 1. The cooled dead milled rubber was then banded on a mill of the dimensions shown in Example 1, and the mill was adjusted to produced a small rolling bank. The mill rolls were maintained at 100° F. during the banding step. The zinc oxide, sulfur, and antioxidant were added and blended into dead milled rubber on the mill. After blending, the mix was sheeted off the mill at a thickness of approximately ⅛ inch and allowed to cool. The mill rolls were cooled to 70–80° F. and the blended mix was again banded on the mill. The mill opening was adjusted to bring both rollers just into contact with the blended stock and to produce a slight folding of the stock at the mill nip, but no bank. At this point the accelerator was slowly added in increments. As soon as all of the accelerator was absorbed, the mix was removed from the mill. The mixing operation was then completed by passing the batch endwise through the mill and rolling about 15 times. Without banding on the mill the batch was sheeted out at a thickness of approximately ¼ inch. After sheeting the batch was stored and maintained at a temperature of less than 40° F. until immediately prior to molding and curing. At room temperature, the raw stock was very tacky but soft and pliable and could be hand-shaped into any desired contour.

Example 3

The blended dead milled stock of Example 2 was removed from refrigeration, brought to room temperature. A plaster model of a tire tread segment was assembled with ends, gate and riser to provide a mold assembly, and proper vents were also provided. The mold was coated with a mold-release agent, Dow Corning 20,[3] as a 10–25% solution in toluene. The mold, at room temperature, was loaded by placing the greater mass of the rubber stock against the positive tread pattern of the model with the side ends of the stock approximately one inch in from the side ends of the pattern. A thickness of approximately ¼ inch of stock was extended over the side wall pattern of the mold to within approximately one inch of the walls of the mold. The mold was closed, placed under a pressure of 6 pounds per square inch, and heated for four hours in an oven maintained at 150° F. After the curing step, the mold was allowed to cool at room temperature and the vulcanized mat was stripped therefrom. The molded vulcanizate constituted a sharp negative replica of the positive plaster tire tread model employed. The mat was tough, pliable, resilient, and dimensionally stable. The following physical properties of the vulcanizate were determined:

| | |
|---|---|
| Tensile strength | 1325 p.s.i. (pounds per square inch) |
| Elongation at break | 660% |
| 400% modulus | 300 p.s.i. |
| 600% modulus | 1050 p.s.i. |
| Shore A hardness | 32 |
| Tear resistance | 242 pounds per inch at 80° F. |
| Shrinkage | 0.8% |

Example 4

Example 3 was repeated employing a mold pressure of 2.4 pounds per square inch, with somewhat less desirable over-all results as is evidenced by the following data:

| | |
|---|---|
| Tensile strength p.s.i. | 1175 |
| Elongation at break percent | 735 |
| 400% modulus | 100 |
| 600% modulus | 400 |
| Shore A hardness | 31 |

Example 5

Example 3 was repeated curing the molded dead milled rubber stock 17 hours at 150° F. under a mold pressure of 3½ pounds per square inch. A molded vulcanized mat possessing the same apparent physical properties as the vulcanizate described in Example 3 was produced. Specific data with respect to physical characteristics were not recorded.

Example 6

A sample of the blended dead milled rubber stock of Example 2 was shaped about a positive plaster model of a tire tread segment and exposed without pressure to a temperature of 82° F. for 5 days. A second sample was similarly shaped and exposed to a temperature of 150° F. for 2 hours. A satisfactory cure was obtained under both sets of conditions. The vulcanizates were tough, pliable and resilient.

Example 7

The negative mat of vulcanized dead milled natural rubber of Example 3 was used repeatedly in the produc-

---

[3] A polydimethyl siloxane resin.

tion of ethyl silicate-sand mold cores by the Shaw process. After continued use the mat remained pliable, resilient and dimensionally stable. Upon aging and repeated use, the mat did not crack, tear, check, become stiff, hard or distorted in shape, size or design.

*Example 8*

A cured sample of a negative intermediate mat of Example 3 and a sample of an intermediate mat comprising a conventionally employed Thiokol rubber (LP2) were exposed for various periods of time to a solution of 25/75 ethyl silicate and ethyl alcohol. The Thiokol compound softened quickly, shrank, and the ridged areas formed by the grooves of the positive plaster model shrank and became straighter, deviating very substantially from the original shape. The mold comprising vulcanized dead milled natural rubber exhibited no observable change.

*Example 9*

Examples 2 and 3 are repeated using the following recipe:

| | Parts |
|---|---|
| Dead milled rubber | 100.0 |
| Zinc oxide | 20.0 |
| HiSil | 20.0 |
| Sulfur | 5.0 |
| Butyl Eight | 8.0 |
| Antioxidant (2,2,4-trimethyl-6-phenyl-1,2-dihydroquinoline) | 3.0 |

The mixed recipe before vulcanization is considerably more viscous than that of Example 2, because of the addition of HiSil and the use of an increased amount of zinc oxide and sulfur. The vulcanizate is somewhat harder and less flexible than the vulcanizate of Example 3, but is tough, resilient and dimensionally stable. The increased viscosity of the mix prior to vulcanization indicates this formulation to represent a practical upper limit as to the quantity of metallic oxide and semi-reinforcing pigment which can be readily employed. The use of larger amounts of these materials produces a stock which is undesirably viscous for use in the preparation of molds having intricate patterns.

*Example 10*

Example 9 is repeated, substituting a non-reinforcing or semi-reinforcing carbon black for the semi-reinforcing HiSil. Similar results are obtained.

*Example 11*

Several ethyl silicate-sand mold cores made in accordance with Example 7 are used in the production of a metal mold for use in the ultimate production of rubber tires. The mold exhibits a uniform, undistorted negative design of the original plaster models of the tread segments. A pneumatic rubber tire is cured in the metal mold in a conventional manner. After cooling the tire tread is found to be an exact replica of the plaster positive models utilized in accordance with Example 3. The tire tread is of uniform undistorted design.

From the foregoing examples, it is evident that an intermediate mat comprising a vulcanized dead milled rubber composition is markedly superior to the prior art intermediate mats heretofore employed in the Shaw process. When prepared in accordance with this invention, the dead milled rubber intermediate mat is pliable, resilient and capable of repeated use in the production of additional models or of metal molds, which faithfully reproduce the original design.

The viscosity of the dead milled rubber composition of the invention becomes lower as the composition is heated at the beginning of the curing step, thereby insuring the faithful reproduction of fine detail in the model; as heating continues the composition vulcanizes within a few hours to a set condition, retaining the detailed pattern of the model in permanent form. In contrast, the prior art Thiokol polymer compositions do not thin out after contact with a model but gradually air cure to a set condition after several days at room temperature.

A porous model should preferably be sealed before contact with the dead milled rubber composition. Silicone resin solutions have proven satisfactory. Molds must be sealed and coated with a release agent, for example as indicated in Example 3, if a loose mat is required. The rubber mat should be anchored to the mold when this technique will produce satisfactory casts, since the accuracy of successive casts will be maintained for a greater period of time by this method; in such event rigid mold anchors should be provided before the dead milled rubber composition is pressed into the mold, in the manner known to those skilled in the art of manufacturing molds.

Vulcanization desirably will be effected by placing the mold assembly containing the dead milled rubber composition into an oven maintained at 100–200° F. for a period between about one and about 24 hours. When a plaster model is utilized, it is wise to avoid temperatures in excess of about 150° F. As indicated in the examples the curing temperature is preferably maintained at about 150° F. for a period of about 4 to 20 hours for compositions equivalent in curing properties to the composition of Example 2.

Since various modifications of the invention as described will occur to those skilled in the art, it is intended that its scope be limited only by the claims appended hereto.

We claim:

1. A method of making a pliable, resilient, dimensionally stable mat structure suitable for repeated use in the production of models and mold cores, which comprises forming a positive model, pressing against said model at a temperature below 200° F. a composition comprising dead milled rubber, a vulcanizing agent and an activated dithiocarbamate accelerator, and then vulcanizing said composition in contact with said model by heating it for one to 24 hours at 100–200° F. to form a vulcanized rubber mat.

2. The method according to claim 1 wherein the vulcanizing agent is sulfur, utilized to the extent of 0.5 to 5 parts by weight per 100 parts of dead milled rubber 3. A method of making a pliable, resilient, dimensionally stable mat structure suitable for repeated use in the production of models and mold cores, which comprises forming a positive model, pressing against said model, at room temperature and at a pressure of no more than 10 pounds per square inch, a composition comprising dead milled rubber, and based on each 100 parts by weight of said rubber, between about 0.5 and about 5 parts of a vulcanizing agent, between about 1 and about 20 parts of a metallic oxide, between about 1 and about 8 parts of an ultra accelerator and an activator therefor, and vulcanizing said composition by heating it in contact with said model for between one and 24 hours at a temperature of from about 100° F. to about 200° F. to form a vulcanized rubber mat.

References Cited in the file of this patent
UNITED STATES PATENTS

| 1,007,434 | Destribats | Oct. 31, 1911 |
|---|---|---|
| 1,599,534 | Kerley | Sept. 14, 1926 |
| 2,263,001 | Gunsaulus et al. | Nov. 18, 1941 |
| 2,831,823 | Murray | Apr. 22, 1958 |